United States Patent [19]

Eggleston, III et al.

[11] 4,378,601

[45] Mar. 29, 1983

[54] SLAB AND HOLDER FOR FACE PUMPED SLAB LASER

[75] Inventors: John M. Eggleston, III; Robert L. Byer, both of Stanford, Calif.

[73] Assignee: The Board of Trustees of the Leland Stanford Junior University, Stanford, Calif.

[21] Appl. No.: 219,230

[22] Filed: Dec. 22, 1980

[51] Int. Cl.³ .......................... H01S 3/02; H01S 3/05
[52] U.S. Cl. ........................................ 372/66; 372/35; 372/70
[58] Field of Search ....................... 372/39, 40, 41, 35, 372/70, 66, 109

[56] References Cited

U.S. PATENT DOCUMENTS 3,633,126  1/1972  Martin et al. .......................... 372/35
4,214,216  7/1980  Jones ...................................... 372/70

OTHER PUBLICATIONS

Lubin et al., "A Large Aperture Nd-Glass Face Pumped Laser Amplifier for High Peak Power Application", General Electric Research Laboratories, Report #72CRD143, May 1972.
Jones et al., "Performance Characteristics of Two Face-Pumped, Face-Cooled Glass Lasers, the Mini-FPS and the Big Mini-FPL", General Electric Corporate Research and Development Technical Report AFAL-TR-72-233, Dec. 1972.

*Primary Examiner*—James W. Davie
*Attorney, Agent, or Firm*—Flehr, Hohbach, Test, Albritton & Herbert

[57] ABSTRACT

A face pumped slab laser includes a housing within a resonator cavity for housing a slab of host material and a light source for pumping the slab. The slab is mounted in a holder which is readily inserted in or retracted from the housing. The holder rigidly supports the slab without inducing stresses therein. The holder includes first and second longitudinal support members with generally U-shaped cross sections for engaging the top and bottom surfaces of the slab. Each end of the slab is engaged by two cooperating support members which have surfaces for receiving the periphery of the face of the slab. Ears on the first and second support members mate with brackets on support members at either end of the slab.

7 Claims, 16 Drawing Figures

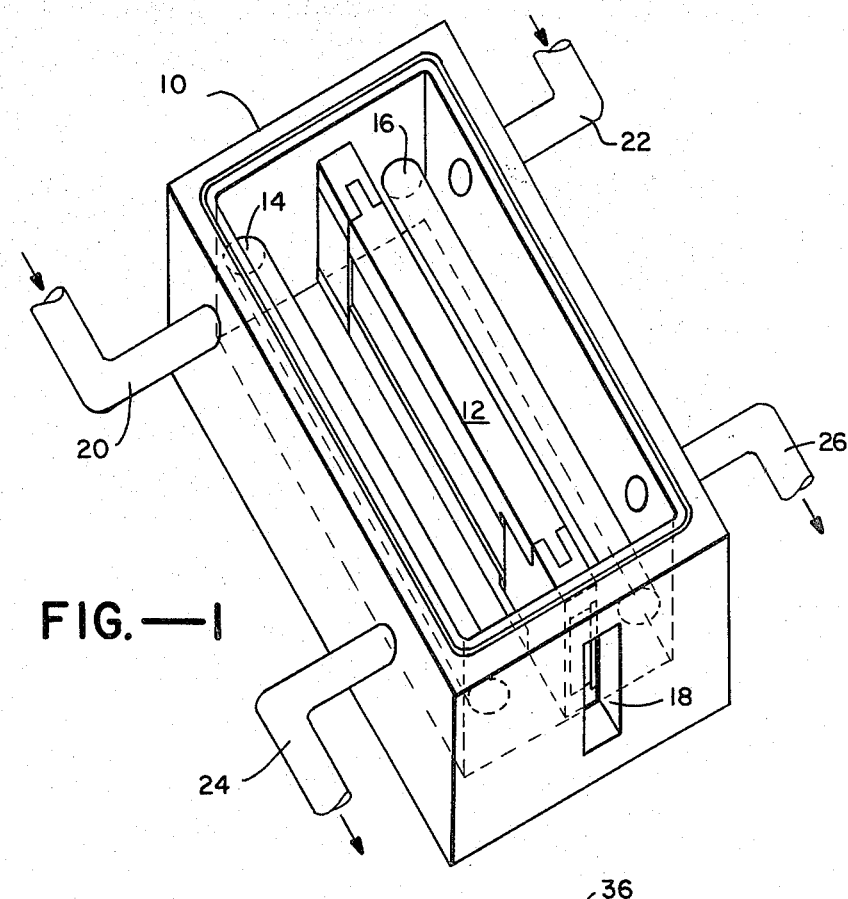
FIG.—1
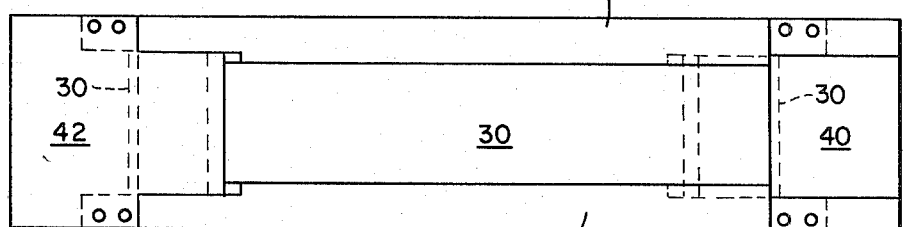
FIG.—2
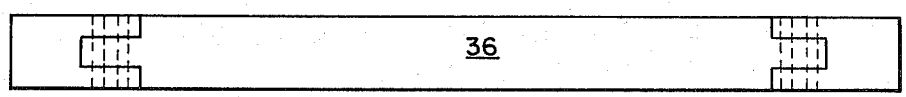
FIG.—3
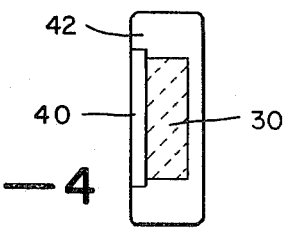
FIG.—4

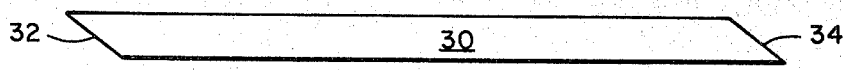
FIG.—5
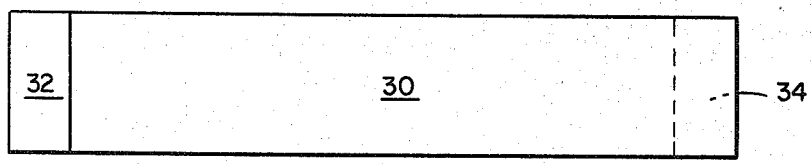
FIG.—6
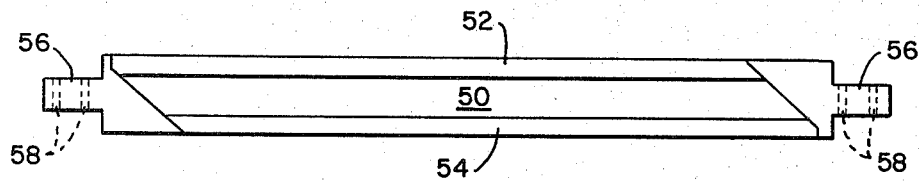
FIG.—7
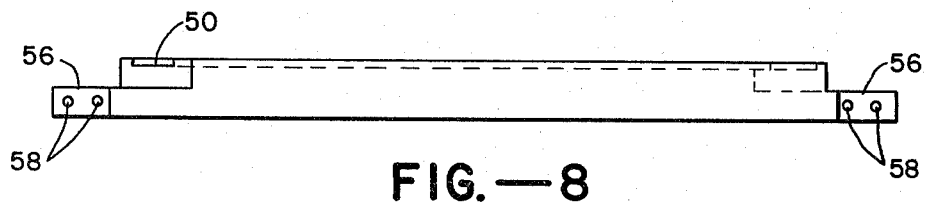
FIG.—8
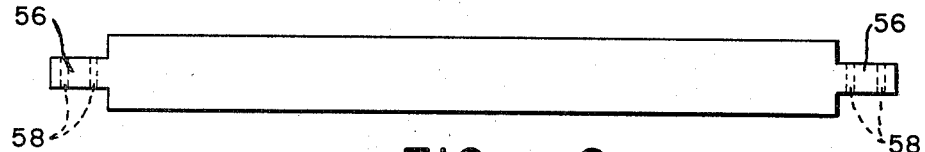
FIG.—9
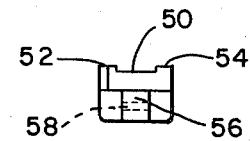
FIG.—10

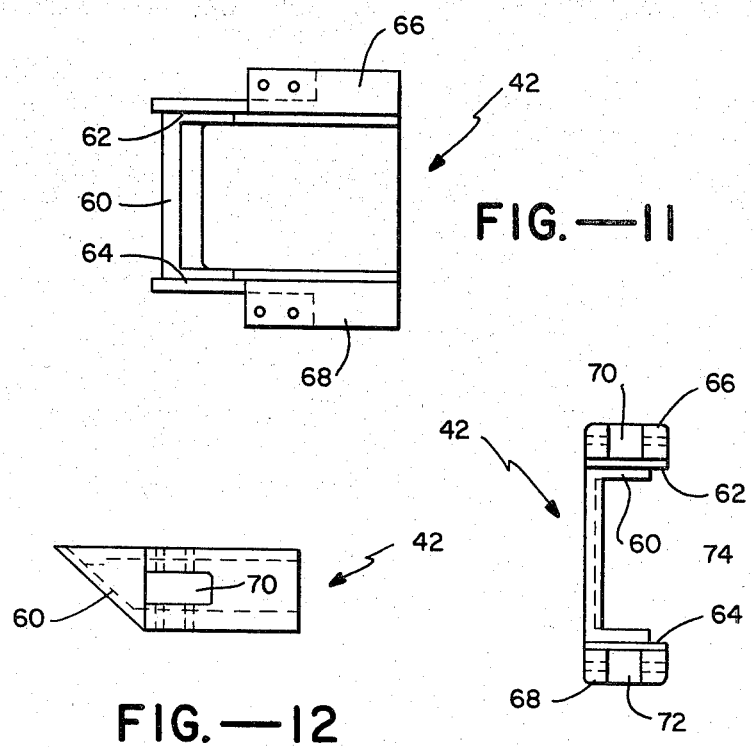
FIG.—11
FIG.—12
FIG.—13
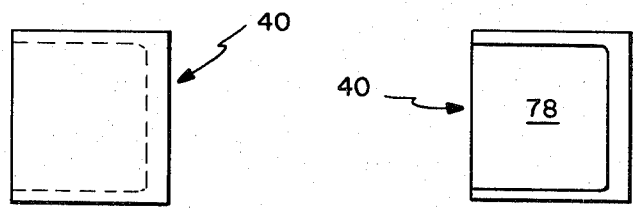
FIG.—14
FIG.—15
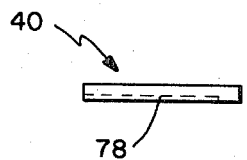
FIG.—16

SLAB AND HOLDER FOR FACE PUMPED SLAB LASER

This invention was developed with U.S. Government funding under ARO Contract No. DAAG 2979C0181.

This invention relates generally to lasers, and more particularly the invention relates to a slab and holder for use in a face pumped slab laser.

In the face pumped laser a piece of solid state laser host material is placed in a housing with a light wave passing through end faces of the host material. Atoms in the host material are stimulated by a suitable radiation source such as a lamp, and the interaction of the light wave with the excited atoms causes amplification of the light wave.

The host material may comprise a slab of Neodyimum doped glass having a rectangular cross section and highly polished side and end faces. The end faces through which the light wave passes are normally inclined at an angle with respect to the side surfaces. The slab is placed in a housing with the end faces exposed. Suitable lamps are mounted in the housing in alignment with the slab for providing the radiation pumping to the atoms in the slab.

Because of the intense heat generated in pumping the host material, a coolant fluid is passed through the housing to remove heat. While the fluid flows along the sides of the slab, the end surfaces must be sealed from the coolant.

Heretofore, a slab holder for providing strong mechanical support and effectively sealing the end surfaces of the slab and which facilitates the insertion and removal of slabs from the housing has not been available.

Accordingly, an object of the present invention is an improved slab and holder for use in a face pumped laser.

Another object of the invention is a holder for a slab laser host material which provides improved mechanical support.

Still another object of the invention is a slab holder which facilitates sealing of a slab within a radiation pump housing.

Yet another object of the invention is a slab and holder which is readily inserted in and removed from a radiation pump housing.

Briefly, in accordance with the invention a slab and holder for use in face pumped slab laser includes a body of solid state laser host material having a rectangular cross section with top and bottom surfaces, opposing major side surfaces, and opposing end surfaces. First and second support members run the length of the body and are positioned about the top and bottom surfaces of the body. Each of the first and second support members include ears at each end thereof. Preferably, the first and second support members include a centrally disposed U-shaped cross section for receiving the top and bottom surfaces of the body.

Third and fourth generally planar support members are provided at each end of the body. The third and fourth support members engage different major surfaces.

Fifth and sixth support members are provided at each end of the body and are configured to receive ends of the body and engage a major surface, the top surface and the bottom surface. Each of the fifth and sixth support members include a recessed portion for receiving one of the third and fourth members, and each of the fifth and sixth members include opposing bracket portions for receiving ears of the first and second support members. Typically, the end faces of the host material body are inclined at an angle with respect to the major surfaces, and the fifth and sixth members each include a surface portion which is inclined to receive one of the end surfaces.

The third and fourth members cooperate with the fifth and sixth members to rigidly support the body at each end portion. Further, fastening of the ear portions of the first and second support members in the bracket portions of the fifth and sixth members provides a rigid support for the body without inducing stresses in the body. The end portions are readily sealed in the third, fourth, fifth and sixth portions by application of a suitable sealant.

The invention and objects and features thereof will be more readily apparent from the following detailed description and appended claims when taken with the drawing, in which:

FIG. 1 is a perspective view of a housing for a face pumped slab in accordance with the present invention.

FIG. 2 is a side view of the slab and holder of FIG. 1.

FIG. 3 is a top view of the slab and holder of FIG. 2.

FIG. 4 is an end view of the slab and holder of FIG. 2.

FIG. 5 is a top view of the slab of FIG. 1.

FIG. 6 is a side view of the slab of FIG. 1.

FIG. 7 is a top view of a longitudinal support member in the slab holder of FIG. 1.

FIG. 8 is a side view of the support member of FIG. 7.

FIG. 9 is a bottom view of the support member of FIG. 7.

FIG. 10 is an end view of the support member of FIG. 7.

FIG. 11 is a top view of an end support member of the slab holder of FIG. 1.

FIG. 12 is a side view of the support member of FIG. 11.

FIG. 13 is an end view of a support member of FIG. 11.

FIG. 14 is a front view of another support member of the slab holder of FIG. 1.

FIG. 15 is a back view of the support member of FIG. 14.

FIG. 16 is an end view of the support member of FIG. 14.

Referring now to the drawings, FIG. 1 is a perspective view of a housing 10 for a slab and holder shown generally at 12 as used in a face pumped slab laser in accordance with the invention. The housing also includes lamps 14 and 16 which provide radiant energy through the side surfaces of the slab for excitation of the slab atoms and the pumping of a light beam within the slab. Opposite ends of the housing 10 include openings 18 which allow insertion and retraction of the slab and holder in the housing and also allow a light beam to travel the length of the slab between mirror surfaces outside of the housing.

Because of the intense heat generated by the lamps 14 and 16 a liquid coolant is typically passed through inlet lines 20 and 22 through the housing 10 to cool the lamps 14 and 16 and the slab, with the coolant removed through lines 24 and 26.

The slab of solid state laser host material may be either glass or crystalline having a rectangular cross section and highly polished side and end faces. The slab must be rigidly supported in the housing 10 by a holder which does not induce stresses in the slab. Further, the slab and holder must be readily removeable from the housing 10 through the opening 18. Since the laser beam passes through the end faces of the slab, the end faces must be sealed from the coolant fluid in the housing.

FIGS. 2-4 are a side view, top view, and end view, respectively, of the slab and holder shown generally at 12 in FIG. 1; and FIGS. 5 and 6 are a top view and a side view, respectively, of the slab of laser host material. Referring to FIGS. 5 and 6, it is noted that the slab 30 has a rectangular cross section with the end faces 32 and 34 inclined with respect to the side surfaces. The holder in accordance with the invention and as illustrated in FIGS. 2-4 rigidly supports and accommodates the glass slab without inducing stresses therein.

Referring to FIGS. 2-4, the slab 30 is supported along its length at top and bottom by first and second support members 36 and 38. Each end of the slab 30 is supported by two cooperating members such as the generally planar member 40 shown at one end of FIG. 2 and the member 42 at the opposite end and which is configured to receive an end of the slab in engagement with a side surface, the top surface and the bottom surface. The generally planar support members 40 at either end of the holder engage opposite side surfaces of the slab, and the support members 42 at either end of the slab engage opposite side surfaces of the slab. The cooperation of the members 40 and 42 at either end of the slab is illustrated in the end view of FIG. 4 in which the generally planar member 40 mates with a recessed surface of the support member 42 with an end face of the slab 30 positioned therebetween.

The top and bottom support members 36 and 38 are further illustrated in FIGS. 7-10 which are a top view, a side view, a bottom view, and an end view, respectively, of the support member 38. It will be appreciated that the top support member 36 is similar in configuration but has opposite inclined surfaces for engaging the end faces of the slab.

Each of the support members 36, 38 have a centrally disposed U-shaped cross section defining a recessed portion 50 for receiving the laser slab between raised portions 52 and 54 which engage the side surfaces of the slab. At either end of the support member are ears 56 extending from surfaces offset from the surface 50 which receives the slab. Holes 58 are provided through the ears 56 to receive pins which fasten the two support pieces to end support pieces 42 of FIGS. 2-4.

FIGS. 11-13 illustrate a side view, top view, and end view, respectively, of the end support member 42 of FIG. 2, and FIGS. 14-16 illustrate a front view, back view, and end view, respectively, of the planar support member 40 of FIG. 2. Referring first to FIGS. 11-13, the member 42 includes an inclined surface 60 for receiving the edge of an end face of the slab 30 with surfaces 62 and 64 engaging the top surface and bottom surface, respectively, of the slab. Opposing bracket portions 66 and 68 are provided on opposite sides of the support member 42, and slots 70 and 72 are provided in the bracket portions for receiving the ears 56 of the support members shown in FIGS. 7-10. The open side of the support member 42 includes a recessed surface 74 for receiving the planar support member 40 shown in FIGS. 14-16.

Referring to FIGS. 14-16, planar member 40 includes a recessed surface 78 for receiving a side edge of the slab 30 when assembled with the cooperating support member 42. The open end of the recessed surface 78 overlaps the end face of the slab. Advantageously, in assembling the slab in the cooperating support members 40 and 42, a suitable sealant such as a silicon elastomer glue can be provided around the edges of the end faces of the slab to seal the end faces from the coolant.

The support members are made of a suitable metal such as aluminum or brass which may be copper or nickel plated with a silver overcoat. The overlapping engagement of the support members with the surfaces of the slab provide a rigid support for the slab, and the cooperative arrangement of the assembled support pieces prevents torsion and rigidly supports the slab without inducing stress in the slab. The slab holder is readily inserted into and removed from the housing, with O ring type seals in the housing engaging the support members to prevent leakage of the coolant fluid from the housing.

While the invention has been described with reference to a specific embodiment, the description is illustrative of the invention and is not to be construed as limiting the invention. Various modifications and applications may occur to those skilled in the art without departing from the true spirit and scope of the invention as defined by the appended claims.

What is claimed is:

1. A slab and holder for use in a face pumped slab laser comprising
   a body of solid state laser host material having a rectangular cross section with top and bottom surfaces, opposing side surfaces, and opposing end faces,
   first and second support members running the length of said body and positioned about the top and bottom surfaces of said body, respectively, each of said first and second support members including ears at each end,
   third and fourth generally planar support members each engaging a side surface of said body near ends of said body,
   said third and fourth members engaging opposite side surfaces and at opposite ends of said body;
   fifth and sixth support members configured to receive opposing ends of said body in engagement with a side surface, said top surface, and said bottom surface, each of said fifth and sixth support members engaging different side surfaces, each of said fifth and sixth members including a recessed portion for receiving one of said third and fourth members, and each of said fifth and sixth members including opposing bracket portions for receiving ears of said first and second support members.

2. A slab and holder as defined by claim 1 wherein said end faces of said body are inclined at an angle with respect to said major surfaces and said fifth and sixth members each include a surface portion which is inclined to cooperate with one of said end faces.

3. A slab and holder as defined by claim 1 or 2 wherein said first and second support members include a centrally disposed U-shaped cross section for receiving said top and bottom surfaces.

4. For use in a face pumped slab laser, means for amplifying a light wave comprising:
   a housing having openings at opposing ends and means for passing a coolant fluid through said housing,
   excitation means mounted in said housing for providing excitation to atoms of a host material, a slab and holder removably mounted in said housing through said openings, said slab and holder including a body of solid state laser host material having a rectangular cross section with top and bottom surfaces, opposing side surfaces, and opposing end faces, first and second support members running the length of said body and positioned about the top and bottom surfaces of said body, respectively, each of said first and second support members including ears at each end, third and fourth generally planar support members each engaging a side surface of said body near ends of said body, said third and fourth members engaging opposite side surfaces and at opposite ends of said body, and fifth and sixth support members configured to receive opposing ends of said body in engagement with a side surface, said top surface and said bottom surface, each of said fifth and sixth support members engaging different side surfaces, each of said fifth and sixth members including a recessed portion for receiving one of said third and fourth members, and each of said fifth and sixth members including opposing bracket portions for receiving ears of said first and second support members.

5. Means for amplifying a light wave as defined by claim 4 wherein said housing includes seals around said openings for engaging said slab and holder to prevent leakage of coolant from said housing.

6. Means for amplifying a light wave as defined by claim 4 wherein said excitation means comprises a light source.

7. Means for amplifying a light wave as defined by claim 4 or 6 wherein said light means comprises first and second lights positioned on opposite sides of said slab and axially aligned therewith.

* * * * *